United States Patent
Kim et al.

(10) Patent No.: US 12,533,099 B2
(45) Date of Patent: Jan. 27, 2026

(54) MEDICAL IMAGE PROCESSING APPARATUS, MEDICAL IMAGE LEARNING METHOD, AND MEDICAL IMAGE PROCESSING METHOD

(71) Applicant: PROMEDIUS INC., Seoul (KR)

(72) Inventors: Namkug Kim, Seoul (KR); Miso Jang, Seoul (KR); Min Gyu Kim, Suwon-si (KR)

(73) Assignee: PROMEDIUS INC., Seoul (KR)

( * ) Notice: Subject to any disclaimer, the term of this patent is extended or adjusted under 35 U.S.C. 154(b) by 433 days.

(21) Appl. No.: 18/264,976

(22) PCT Filed: Sep. 9, 2021

(86) PCT No.: PCT/KR2021/012271
§ 371 (c)(1),
(2) Date: Aug. 10, 2023

(87) PCT Pub. No.: WO2022/055271
PCT Pub. Date: Mar. 17, 2022

(65) Prior Publication Data
US 2024/0130703 A1 Apr. 25, 2024
US 2024/0225581 A9 Jul. 11, 2024

(30) Foreign Application Priority Data

Sep. 9, 2020 (KR) .......................... 10-2020-0115689

(51) Int. Cl.
*A61B 6/00* (2024.01)
*A61B 6/50* (2024.01)
(Continued)

(52) U.S. Cl.
CPC ............ *A61B 6/5217* (2013.01); *A61B 6/505* (2013.01); *G06T 7/0012* (2013.01); *G16H 30/40* (2018.01);
(Continued)

(58) Field of Classification Search
CPC ... A61B 6/505; A61B 2034/105; A61B 6/032; A61B 5/4509; A61B 5/7267;
(Continued)

(56) References Cited

U.S. PATENT DOCUMENTS 8,781,191 B2 * 7/2014 Lang .................... A61B 5/4509
382/128
10,622,102 B2 * 4/2020 Itu .......................... G16H 30/40
(Continued)

FOREIGN PATENT DOCUMENTS

JP 2017-164412 A 9/2017
JP 2019-154943 9/2019
(Continued)

OTHER PUBLICATIONS

Machine translation obtained from Google Patents of KR-20180029476-A (Year: 2018).*
(Continued)

*Primary Examiner* — Courtney Joan Nelson
(74) *Attorney, Agent, or Firm* — Studebaker Brackett PLLC (57) ABSTRACT

A method for training a medical image performed by a medical image processing apparatus for processing a medical image for a body is provided. The method for training a medical image includes preparing a first input data set including a training chest X-ray image, and a bone enhancement image or a bone extraction image acquired from the training chest X-ray image; preparing a label data for the first input data set including osteoporosis information or bone mineral density information corresponding to the training chest X-ray image; and training an artificial neural network model using the first input data set and the label data.

6 Claims, 7 Drawing Sheets

(51) Int. Cl.
G06T 7/00 (2017.01)
G16H 30/40 (2018.01)

(52) U.S. Cl.
CPC ............... *G06T 2207/10116* (2013.01); *G06T 2207/20081* (2013.01); *G06T 2207/20084* (2013.01); *G06T 2207/30008* (2013.01)

(58) Field of Classification Search
CPC ... A61B 6/5217; A61B 5/4842; A61B 6/5205; A61B 6/50; A61B 5/4566; G06V 10/82; G06V 2201/033; G06V 2201/03; G06T 7/0012; G06T 2207/10116; G06T 2207/20081; G06T 2207/20084; G06T 2207/30008; G06T 2211/441; G06T 2210/41; G06T 2207/10081; G06T 2207/30036; G06T 7/00; G06N 3/08; G06N 3/0464; G06N 20/00; G16H 30/20; G16H 30/40; G16H 50/30; G16H 50/20
See application file for complete search history.

(56) References Cited

U.S. PATENT DOCUMENTS 12,033,318 B2 * 7/2024 Watanabe ................. G06T 7/11
2003/0198316 A1  10/2003 Dewaele et al.

FOREIGN PATENT DOCUMENTS

| KR | 10-2018-0029476 A |   | 3/2018 |              |
|----|-------------------|---|--------|--------------|
| KR | 20180029476 A     | * | 3/2018 | ........... A61B 6/5211 |
| KR | 10-1874348 B1     |   | 7/2018 |              |
| KR | 10-2020-0015379 A |   | 2/2020 |              |
| KR | 20200015379 A     | * | 2/2020 | ............... A61B 6/14 |
| KR | 10-2020-0023916 A |   | 3/2020 |              |
| WO | WO-2019098399 A1  | * | 5/2019 | ............... A61B 6/03 |
| WO | 2020/054738 A1    |   | 3/2020 |              |

OTHER PUBLICATIONS

Machine translation obtained from Google Patents of KR-20200015379-A (Year: 2020).*
Machine translation obtained from Google Patents of WO-2019098399-A1 (Year: 2019).*
An Office Action mailed by the Korean Intellectual Property Office on Jan. 30, 2023, which corresponds to Korean Patent Application No. 10-2020-0115689 and is related to U.S. Appl. No. 18/264,976; with English language translation.
B. Park et al., "Curriculum learning from patch to entire image for screening pulmonary abnormal patterns in chest-PA X-ray: intra- and extra-validations on multi-center datasets", 1st Conference on Medical Imaging with Deep Learning (MIDL 2018), Amsterdam, The Netherlands, Apr. 12, 2018, pp. 1-3.

* cited by examiner

MEDICAL IMAGE PROCESSING APPARATUS, MEDICAL IMAGE LEARNING METHOD, AND MEDICAL IMAGE PROCESSING METHOD

TECHNICAL FIELDS

The present invention relates to a method and apparatus for learning medical images of a body, and to a method and apparatus for processing the medical images of the body.

BACKGROUND ART

A medical imaging apparatus is equipment for acquiring an image of an internal structure of a body of a diagnosis target. The medical imaging apparatus is a non-invasive inspection apparatus, which photographs and processes structural details, internal tissues, and fluid flows in the body and shows these to a user. The user such as a doctor may diagnose a health condition and disease of a patient using a medical image output from the medical imaging apparatus.

Examples of the medical imaging apparatus include an X-ray imaging apparatus that irradiates a target with X-rays and detects X-rays passing through the target to capture an image, a magnetic resonance imaging (MRI) apparatus for providing a magnetic resonance image, a computed tomography (CT) apparatus, and an ultrasound diagnostic apparatus, and among these, an X-ray imaging apparatus is most widely used.

Meanwhile, according to "Choi, H. J., et al., Burden of osteoporosis in adults in Korea: a national health insurance database study. Journal of bone and mineral metabolism, 2012. 30(1): p. 54-58." and "Lee, Y.-K., B.-H. Yoon, and K.-H. Koo, Epidemiology of osteoporosis and osteoporotic fracture in South Korea. Endocrinology and Metabolism, 2013. 28(2): p. 90-93.", Korea entered an aged society in which a proportion of people aged 65 and older is 14% in 2018, and is expected to enter a super-aged society in which the proportion of the people aged 65 and older is over 25% in 2025. The aged society and/or the super-aged society causes various aging problems; one of the problems is that the number of osteoporosis patients increases, and medical costs and economic costs for a fracture due to the osteoporosis and the osteoporosis rapidly increase.

The osteoporosis refers to a condition in which bone strength is lowered and a fracture is highly likely to occur, is a bone disease that progresses throughout the entire body, and is a skeletal disease in which the risk of the fracture increases due to a loss of bone strength.

According to "Hong, S. and K. Han, The incidence of hip fracture and mortality rate after hip fracture in Korea: A nationwide population-based cohort study. Osteoporosis and Sarcopenia, 2019." and "Jung, H.-S., et al., Incidence of Osteoporotic Refractures Following Proximal Humerus Fractures in Adults Aged 50 Years and Older in Korea. Journal of Bone Metabolism, 2019. 26(2): p. 105-111.", osteoporosis has no symptoms, but when a fracture occurs, a secondary fracture is highly likely to occur and the occurrence of complications increases, and thus, it is important to prevent a bone mineral density from being reduced before the fracture occurs, and to perform a screening test for reduction in the bone mineral density in order to prevent the bone mineral density from being reduced.

Bone strength is determined by bone quality and bone mineral density, which are determined by bone turnover rate, structure, fine damage, and mineralization, and since 80% of the bone strength depends on the bone mineral density, bone mineral density measurement is a useful method for osteoporosis diagnosis.

According to "LewieckiEM, LaneNE. Common mistakes in the clinical use of bone mineral density testing. Nat Clin Pract Rheumatol. 2008; 4:667-674", "Jae Gyoon Kim and Young Wan Moon. 2011. Diagnosis of Osteoporosis. Hip & Pelvis (formerly Journal of the Korean Hip Society), 23(2): 108-115", and "Ho-Sung, K., Tae-Hyung, K., & Sang-Hyun, K. (2018). Management Methods of Bone Mineral Density Examination Using Dual Energy X-ray Absorptiometry. Journal of Radiological Science and Technology, 41(4), 351-360", the International Society for Clinical Densitometry (ISCD), an international academic organization, recognizes dual energy X-ray absorptiometry (DXA) as the most suitable bone mineral density measurement method. With the dual energy X-ray absorptiometry, bone mineral densities of a lumbar spine and a femur, which are central bones, are measured and diagnosis into any one of osteoporosis, osteopenia, and normality is performed on the basis of a smallest value thereof.

According to a study using the National Health and Nutrition Examination Survey published in "Lee, K.-S., et al., New reference data on bone mineral density and the prevalence of osteoporosis in Korean adults aged 50 years or older: the Korea National Health and Nutrition Examination Survey 2008-2010. Journal of Korean medical science, 2014. 29(11): p. 1514-1522." and "Kim, K. H., et al., Prevalence, awareness, and treatment of osteoporosis among Korean women: the Fourth Korea National Health and Nutrition Examination Survey. Bone, 2012. 50(5): p. 1039-1047." one out of four adults over the age of 50 have osteoporosis, two out of three women and one out of five men over the age of 70 have osteoporosis, only one out of ten people is diagnosed and treated by a doctor even though the osteoporosis is a very common disease, and particularly, most men do not recognize the osteoporosis as a health problem. In national general health checkups, only women between 54 and 66 years old are subjected to bone mineral density tests, and a diagnosis rate for men is inevitably lower.

Further, according to "https://www.hira.or.kr/dummy.do?pgmid=HIRAA030060000000&cmsurl=/cms/medi_info/02/01/1343529_27565.html& subject=%EA%B3%A8%EB%BO%80%EB%8F%84+%EA%B2%80% EC%82%AC", the National Health Insurance Service recognizes insurance benefits of bone mineral density for one diagnosis and follow-up examination for one or more years with respect to women over 65 and men over 70, except for a case in which there are high risk factors. Therefore, a management rate of the osteoporosis is inevitably insufficient for women whose risk of the osteoporosis increases after menopause around the age of 50 and men with low awareness of diseases.

According to "Yu, T. Y., Cho, H., Kim, T.-Y., Ha, Y.-C., Jang, S., & Kim, H. Y. (2018). Utilization of Osteoporosis-Related Health Services: Use of Data from the Korean National Health Insurance Database 2008-2012. J Korean Med Sci, 33(3).", analysis of health insurance review claim data shows the occurrence of osteoporotic fractures has continuously increased from 140,000 in 2008 to 210,000 in 2012, indicating the importance of management of osteoporosis.

However, the dual energy X-ray absorptiometry, known as the most suitable bone mineral density measurement method for a screening test for bone mineral density reduction, requires higher cost and relatively higher radiation exposure than the most widely used X-ray imaging test among medical imaging apparatuses, and is not performed as frequently as the X-ray imaging test.

(Patent Document 1) Japanese Unexamined Patent Publication No. 2019-154943 (Sep. 19, 2019)

SUMMARY

According to an embodiment, a medical image learning method and a medical image processing apparatus for causing an artificial neural network model to learn a chest X-ray image and osteoporosis information or bone mineral density information to classify a normal group and a high risk group for osteoporosis using a chest X-ray image are provided.

Further, a medical image processing method and a medical image processing apparatus for acquiring osteoporosis information or bone mineral density information from a chest X-ray image of a diagnosis target using a trained artificial neural network model are provided.

The aspects of the present disclosure are not limited to the foregoing, and other aspects not mentioned herein will be clearly understood by those skilled in the art from the following description.

In accordance with a first aspect of the present disclosure, there is provided a method for training a medical image to be performed by a medical image processing apparatus, the method comprises: preparing as a first input data set a training chest X-ray image, and a bone enhancement image or a bone extraction image acquired from the training chest X-ray image; preparing as a label data for the first input data set osteoporosis information or bone mineral density information corresponding to the training chest X-ray image; and training an artificial neural network model using the first input data set and the label data.

In accordance with a second aspect of the present disclosure, there is provided a non-transitory computer-readable recording medium storing computer executable instructions, wherein the instructions, when executed by a processor, cause the processor to perform a method for a medical image.

In accordance with a third aspect of the present disclosure, there is provided a method for processing medical image to be performed by a medical image processing apparatus, the method comprises: inputting a chest X-ray image of a diagnosis target to an artificial neural network model trained by an input data set including at least two of a training chest X-ray image, a bone enhancement image or a bone extraction image acquired from the training chest X-ray image, a soft tissue image acquired from the training chest X-ray image, and a fragment image including only some of a plurality of bones included in the training chest X-ray image, and label data; and outputting osteoporosis information or bone mineral density information acquired from the chest X-ray image of the diagnosis target using the artificial neural network model.

In accordance with a fourth aspect of the present disclosure, there is provided a non-transitory computer-readable recording medium storing computer executable instructions, wherein the instructions, when executed by a processor, cause the processor to perform a method for processing a medical image.

In accordance with a fifth aspect of the present disclosure, there is provided a medical image processing apparatus, the apparatus comprises: an input unit configured to input as a first input data set a training chest X-ray image, and a bone enhancement image or a bone extraction image acquired from the training chest X-ray image, and as a label data osteoporosis information or bone mineral density information corresponding to the training chest X-ray image included in the first input data set; and an artificial neural network model processing unit configured to train an artificial neural network model using the first input data set and the label data input by the input unit.

In accordance with a sixth aspect of the present disclosure, there is provided a medical image processing apparatus, the apparatus comprises: an input unit configured to input a chest X-ray image of a diagnosis target; an artificial neural network model processing unit configured to acquire osteoporosis information or bone mineral density information corresponding to the chest X-ray image of the diagnosis target using an artificial neural network model trained by an input data set including at least two of a training chest X-ray image, a bone enhancement image or a bone extraction image acquired from the training chest X-ray image, a soft tissue image acquired from the training chest X-ray image, and a fragment image including only some of a plurality of bones included in the training chest X-ray image, and label data; and an output unit configured to the output osteoporosis information or the bone mineral density information acquired by the artificial neural network model processing unit.

According to the embodiment of the present invention, an artificial neural network model is trained so that the trained artificial neural network model can acquire the osteoporosis information or the bone mineral density information from a chest X-ray image of the diagnosis target. This makes it possible to output the osteoporosis information or the bone mineral density information of the diagnosis target, or classify chest X-ray images of the diagnosis target into a normal group and a risk group for osteoporosis and output a result of the classification.

According to the embodiment of the present invention, it is possible to classify the chest X-ray images of the diagnosis target into a normal group and a high risk group for osteoporosis without using a bone mineral density test method such as dual energy X-ray absorptiometry or quantitative computed tomography.

DETAILED DESCRIPTION OF EXEMPLARY EMBODIMENTS

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

In the present specification, a diagnosis subject or a patient may include a human or an animal, or a part of the human or animal.

Further, an 'image' in the present specification may refer to multi-dimensional data composed of discrete image elements (for example, pixels in a 2D image and voxels in a 3D image).

Figure 1:
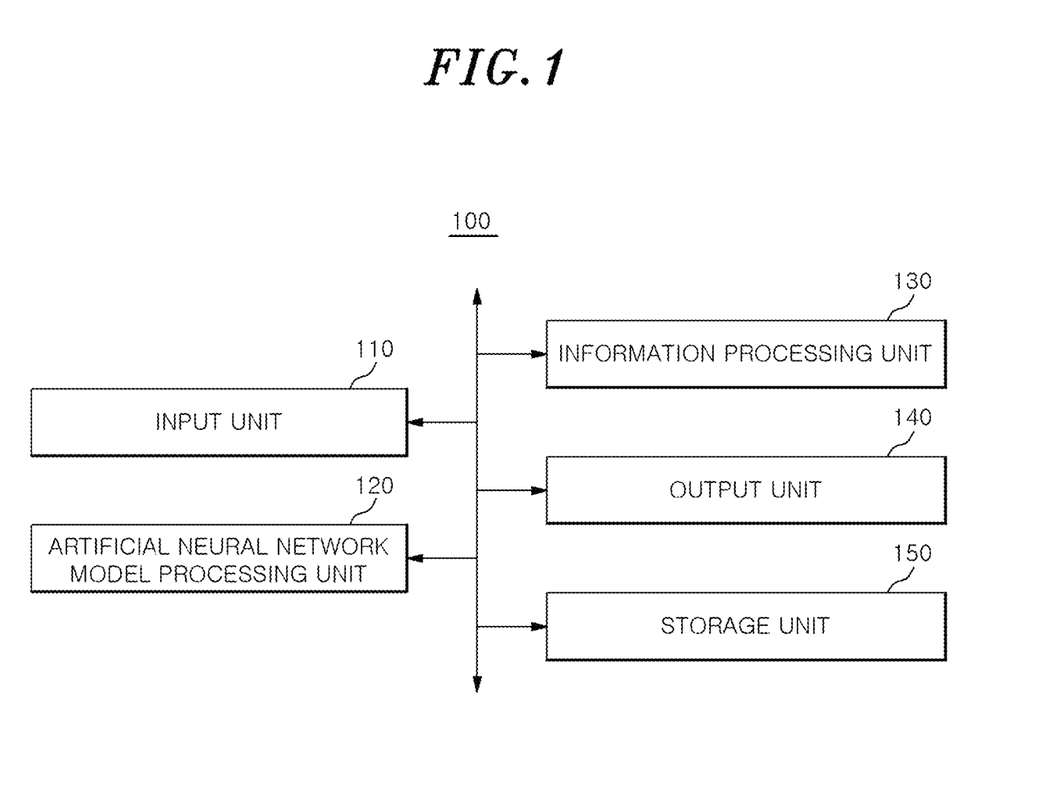
FIG. 1 is a configuration diagram of a medical image processing apparatus according to an embodiment.

FIG. 1 illustrates a configuration of a medical image processing apparatus 100 according to an embodiment. However, FIG. 1 is only an example. The medical image processing apparatus 100 may be implemented in a PC or server, or may include the PC or server.

Referring to FIG. 1, the medical image processing apparatus 100 includes an input unit 110, an artificial neural network model processing unit 120, and may further include one or more of an output unit 140, an information processing unit 130, and a storage unit 150 according to an embodiment.

The input unit 110 receives an input learning data set and label data for training an artificial neural network model of the artificial neural network model processing unit 120. Further, the input unit 110 receives an X-ray image of a body of the diagnosis target to be input to the trained artificial neural network model. For example, the input unit 110 may receive a first input data set and a second input training data set. The first input data set may be a training chest X-ray image, a bone enhancement image or a bone extraction image acquired from the training chest X-ray image, and a soft tissue image acquired from the training chest X-ray image, and label data corresponding to the first input data set may be osteoporosis information or bone mineral density information corresponding to the training chest X-ray image. The second input training data set may be a fragment image including only some of a plurality of bones included in the chest X-ray image for training, and the label data corresponding to the second input training data set may be the osteoporosis information or the bone mineral density information corresponding to the chest X-ray image for training and/or the fragment image.

The artificial neural network model processing unit 120 includes the input learning data set received through the input unit 110, and an artificial neural network model that learns label data. For example, the artificial neural network model processing unit 120 may include a memory that stores instructions programmed to perform functions of the artificial neural network model, and a microprocessor that executes these instructions.

The input learning data set learned by the artificial neural network model of the artificial neural network model processing unit 120 may be an input learning data set received by the input unit 110, which is, for example, the first input data set and/or the second input training data set. The first input data set and/or the second input training data set may be the training chest X-ray images, as described above. For example, the artificial neural network model may pre-learn the second input training data set and label data, and then, post-learn the first input data set and label data. The chest X-ray image in the first input data set contains more information than the fragment image of the second input training data set that can be extracted therefrom. Accordingly, the artificial neural network model learns the second input training data set easier than the first input data set. Accordingly, the artificial neural network model performs learning using curriculum learning in which the second input training data set relatively easy to learn is pre-learned, and then, the first input data set relatively difficult to learn is post-learned. For example, the artificial neural network model may include convolution blocks and global average pooling.

Thus, in the artificial neural network model processing unit 120, the artificial neural network model may learn at least two of the training chest X-ray image, the bone enhancement image or the bone extraction image acquired from the training chest X-ray image, the soft tissue image acquired from the training chest X-ray image, and the fragment image including only some of the plurality of bones included in the training chest X-ray image, and the label data. Here, the bone enhancement image represents an image obtained by enhancing bones in the training chest X-ray image, the bone extraction image represents an image obtained by extracting bones from the training chest X-ray image, and the soft tissue image represents an image obtained by extracting soft tissues from the training chest X-ray image.

Further, the artificial neural network model processing unit 120 may acquire the osteoporosis information or the bone mineral density information from the chest X-ray image of the diagnosis target input through the input unit 110 by the trained artificial neural network model.

The information processing unit 130 can create a class activation map (CAM) in which the chest X-ray images of the diagnosis target are classified into a normal group and a risk group for osteoporosis on the basis of the osteoporosis information or the bone mineral density information for the chest X-ray image of the diagnosis target acquired by the trained artificial neural network model. For example, the information processing unit 130 may include a memory that stores instructions programmed to perform a function of processing various types of information into a predetermined form, and a microprocessor that executes these instructions.

The output unit 140 may output the osteoporosis information or the bone mineral density information of the diagnosis target acquired by the artificial neural network model processing unit 120 to the outside. Alternatively, the output unit 140 may output the CAM for the normal group and the risk group for osteoporosis generated by the information processing unit 130 on the basis of the osteoporosis information or the bone mineral density information acquired by the artificial neural network model, to the outside. The output unit 140 may include a port for outputting various types of information, such as the osteoporosis information, the bone mineral density information, and the CAM in which the chest X-ray images of the diagnosis target are classified into the normal group and the risk group for osteoporosis, of the diagnosis target, a wired communication module, a wireless communication module, and the like. Alternatively, the output unit 140 may include an image display apparatus capable of outputting various types of information such as the osteoporosis information, the bone mineral density information, and the CAM in which the chest X-ray images of the diagnosis target are classified into the normal group and the risk group for osteoporosis, of the diagnosis target in the form of an image.

The storage unit 150 may store commands programmed for the medical image processing apparatus 100 to perform various functions, store various pieces of information such as images received through the input unit 110, or store calculation and processing results of the artificial neural network model processing unit 120. For example, the storage unit 150 may be a magnetic medium such as a hard disk, a floppy disk, or a magnetic tape, an optical medium such as a CD-ROM or a DVD, a magneto-optical medium such as a floptical disk, or a computer-readable recording medium like a hardware apparatus specially configured to store and execute program instructions, such as a flash memory.

Figure 2:
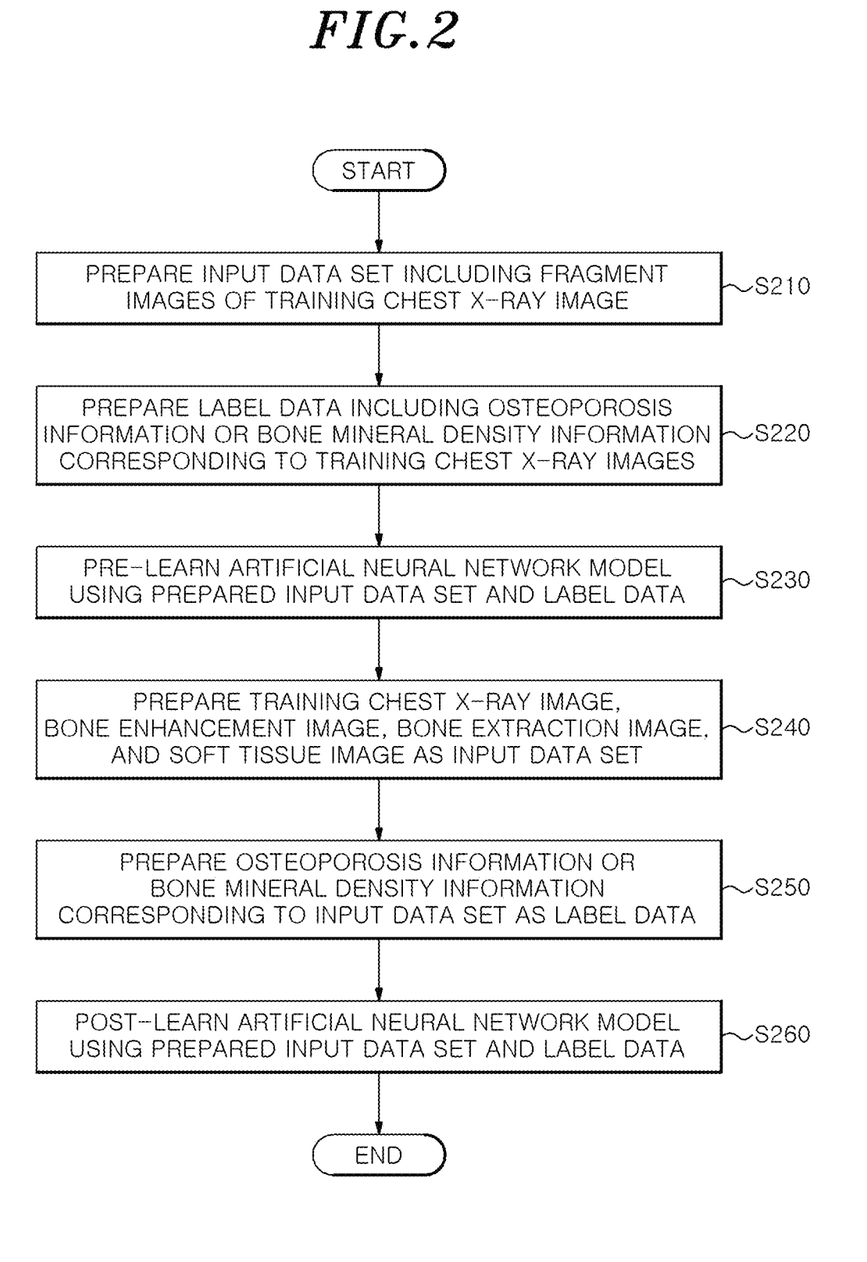
FIG. 2 is a flowchart illustrating a medical image learning method performed by the medical image processing apparatus according to the embodiment.
Figure 3:
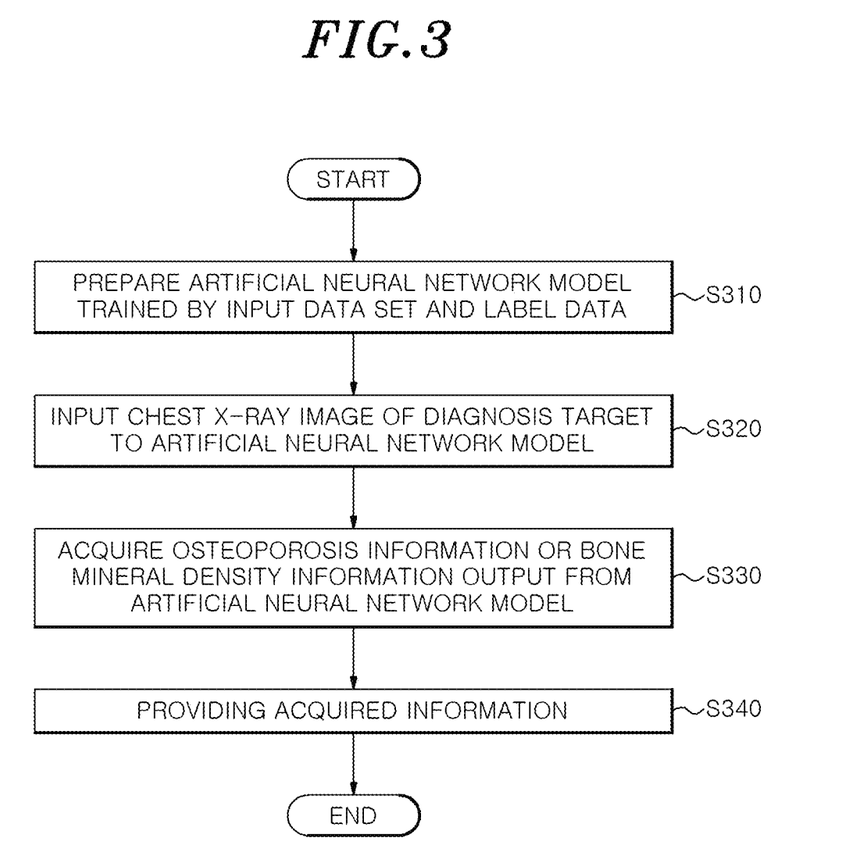
FIG. 3 is a flowchart illustrating a method of processing a medical image performed by the medical image processing apparatus according to the embodiment.
Figure 4A:
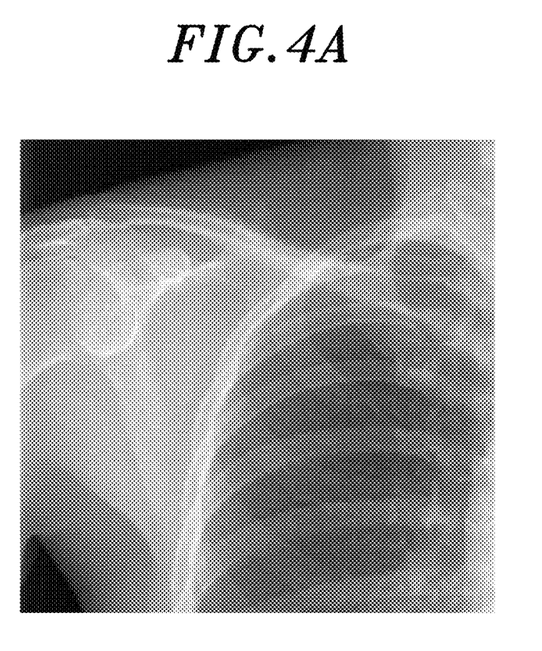
FIG. 4A illustrates an exemplary X-ray image that can be used for medical image learning by the medical image processing apparatus according to the embodiment.
Figure 4B:
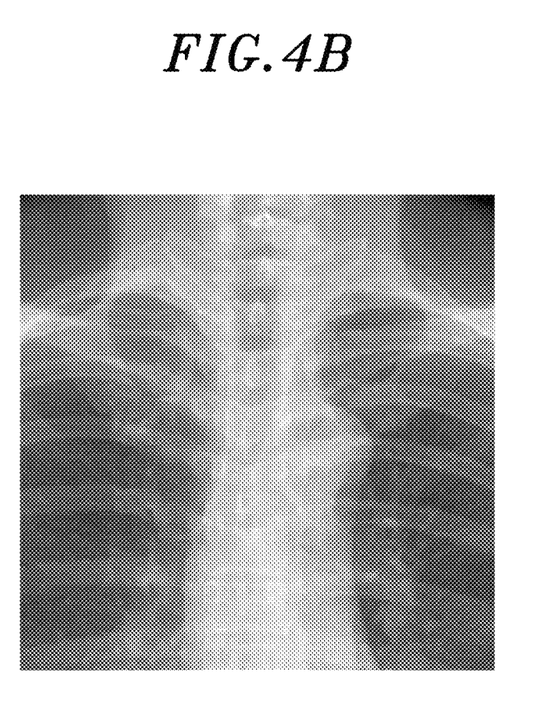
FIG. 4B illustrates an exemplary X-ray image that can be used for medical image learning by the medical image processing apparatus according to the embodiment.
Figure 4C:
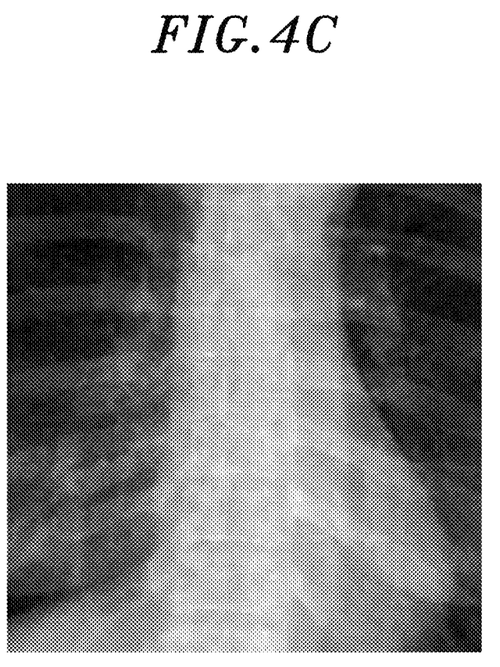
FIG. 4C illustrates an exemplary X-ray image that can be used for medical image learning by the medical image processing apparatus according to the embodiment.
Figure 5A:
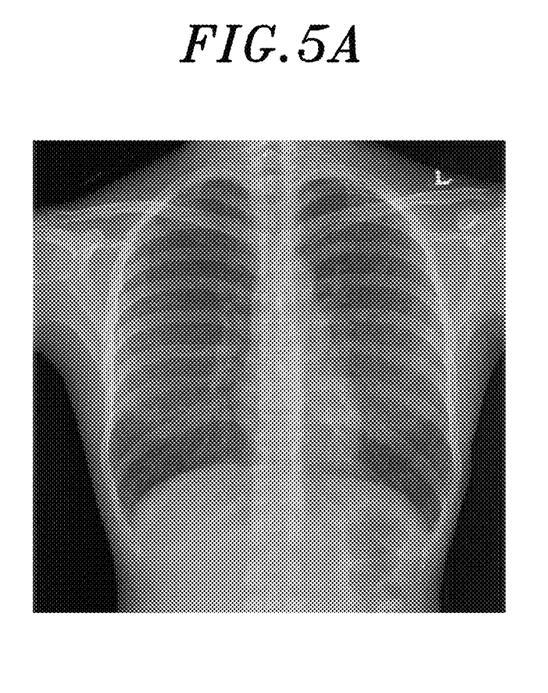
FIG. 5A illustrates an exemplary X-ray image that can be used for medical image learning by the medical image processing apparatus according to the embodiment.
Figure 5B:
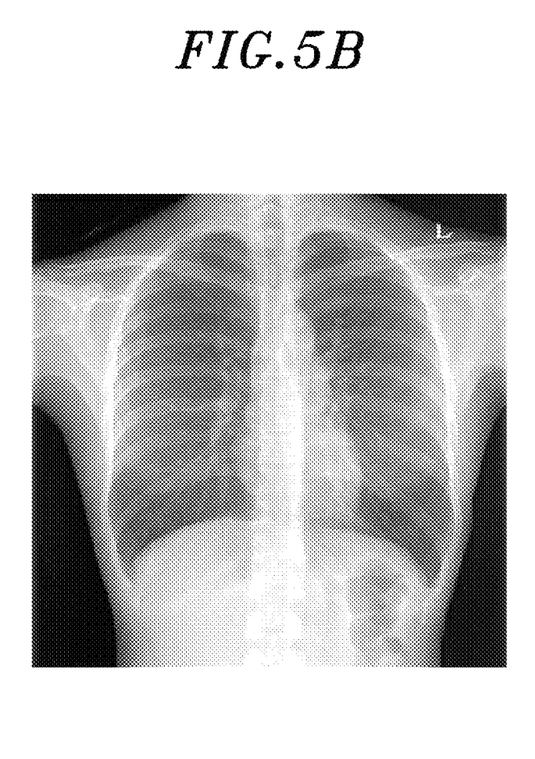
FIG. 5B illustrates an exemplary X-ray image that can be used for medical image learning by the medical image processing apparatus according to the embodiment.
Figure 5C:
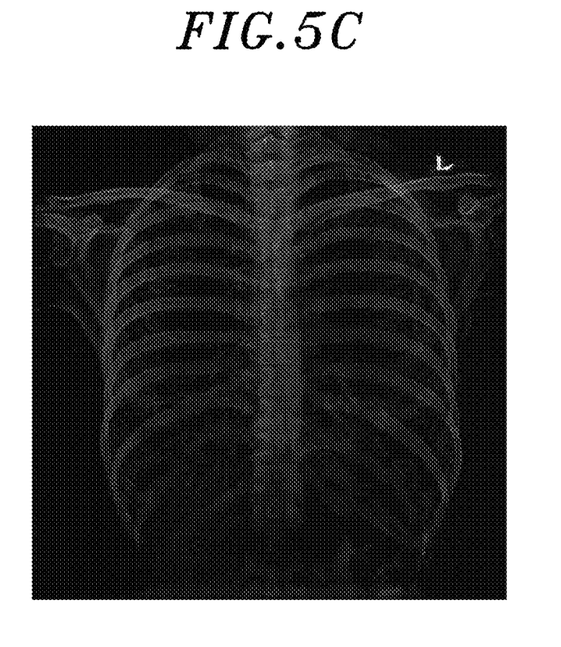
FIG. 5C illustrates an exemplary X-ray image that can be used for medical image learning by the medical image processing apparatus according to the embodiment.
Figure 5D:
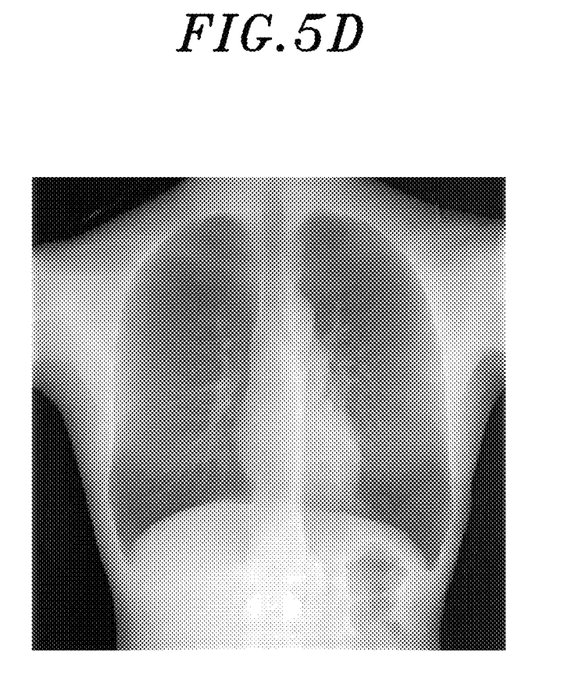
FIG. 5D illustrates an exemplary X-ray image that can be used for medical image learning by the medical image processing apparatus according to the embodiment.

FIG. 2 is a flowchart illustrating a medical image learning method performed by the medical image processing apparatus 100 according to an embodiment, FIG. 3 is a flowchart illustrating a medical image learning method performed by the medical image processing apparatus 100 according to the embodiment, and FIGS. 4A to 4C and 5A to 5D illustrate examples of various X-ray images that can be used for medical image learning by the medical image processing apparatus 100 according to the embodiment.

Hereinafter, the medical image learning method and the medical image processing method performed by the medical image processing apparatus 100 according to the embodiment will be described in detail with reference to FIGS. 1 to 5d.

The medical image learning method of the medical image processing apparatus 100 will be described according to a flow sequence of FIG. 2. As mentioned above, the chest X-ray image in the first input data set contains more information than the fragment image of the second input training data set that can be extracted therefrom. Therefore, it is easier for the artificial neural network model to learn the second input training data set than the first input data set. Accordingly, the artificial neural network model performs learning using curriculum learning in which the relatively easier second input training data set is pre-learned and then the relatively more difficult first input data set is post-learned. In the following description, an embodiment in which the curriculum learning is used in this way will be described. Of course, the medical image processing apparatus 100 may learn only one of the first input data set and the second input training data set or pre-learn the first input data set and then post-learn the second input training data set.

First, the input learning data set for training the artificial neural network model of the artificial neural network model processing unit 120 of the medical image processing apparatus 100 is prepared. For example, the fragment images of FIGS. 4A to 4C as the fragment image including only some of the plurality of bones included in the training chest X-ray image and the training chest X-ray images may be prepared as a plurality of input learning data sets (S210), and the osteoporosis information or the bone mineral density information corresponding to training chest X-ray images may be prepared as label data corresponding to the plurality of input learning data sets (S220). For example, the segment image may be an image including two or less of a clavicle, cervical vertebrae, thoracic vertebrae, and scapula for the training chest X-ray image.

The input learning data set and the label data prepared through steps S210 and S220 are input through the input unit 110 and provided to the artificial neural network model processing unit 120, and the artificial neural network model of the artificial neural network model processing unit 120 pre-learns the input learning data set and the label data in steps S210 and S220 (S230).

Next, the input learning data set and the label data for training the artificial neural network model of the artificial neural network model processing unit 120 of the medical image processing apparatus 100 are newly input through the input unit 110 and prepared. For example, the training chest X-ray image (FIG. 5a), a bone enhancement image (FIG. 5b) and/or a bone extraction image (FIG. 5c) acquired from the training chest X-ray image, and the soft tissue image (FIG. 5d) acquired from the training chest X-ray image may be prepared as the plurality of input learning data sets (S240), and the osteoporosis information or the bone mineral density information corresponding to the training chest X-ray images (for example, FIG. 5a) may be prepared as label data corresponding to the plurality of input learning data sets (S250). For example, when the bone extraction image (FIG. 5c) is prepared as the input learning data set in step S240, the soft tissue image (FIG. 5d) is prepared together, and then, the bone extraction image (FIG. 5c) and the soft tissue image (FIG. 5d) may be learned together by the artificial neural network model.

The input learning data set and the label data prepared in steps S240 and S250 are input through the input unit 110 and provided to the artificial neural network model processing unit 120, and the artificial neural network model of the artificial neural network model processing unit 120 post-learns the input learning data set and the label data of S240 and S250 (S260).

Next, a medical image processing method of the medical image processing apparatus 100 will be described according to a flow sequence of FIG. 3.

First, in the medical image processing apparatus 100, the artificial neural network model of the artificial neural network model processing unit 120 learns the osteoporosis information or the bone mineral density information corresponding to training chest X-ray images as the input data for learning and training chest X-ray images as the label data, as described with reference to FIG. 2 (S310).

In a state in which the artificial neural network model of the artificial neural network model processing unit 120 has been trained in this way, the chest X-ray image of the diagnosis target is input through the input unit 110 and provided to the artificial neural network model processing unit 120 (S320).

The artificial neural network model of the artificial neural network model processing unit 120 acquires the osteoporosis information or the bone mineral density information of the diagnosis target from the chest X-ray image of the diagnosis target provided in step S320 (S330).

The output unit 140 may output the osteoporosis information or the bone mineral density information of the diagnosis target acquired by the artificial neural network model processing unit 120 to the outside.

Here, the output unit 140 may output the osteoporosis information or the bone mineral density information acquired by the artificial neural network model processing unit 120 in the form of raw data, but may output the osteoporosis information or the bone mineral density information in a predetermined form processed by the information processing unit 130. To this end, the information processing unit 130 may generate the CAM in which the chest X-ray images of the diagnosis target are classified into a normal group and a risk group for osteoporosis on the basis of the osteoporosis information or the bone mineral density information acquired by the artificial neural network model processing unit 120, and provide the CAM to the output unit 140. Then, the output unit 140 may output the CAM generated by the information processing unit 130 to the outside (S340).

According to the embodiment of the present invention, an artificial neural network model is trained so that the trained artificial neural network model can acquire the osteoporosis information or the bone mineral density information from a chest X-ray image of the diagnosis target. This makes it possible to output the osteoporosis information or the bone mineral density information of the diagnosis target, or classify chest X-ray images of the diagnosis target into a normal group and a risk group for osteoporosis and output a result of the classification.

The present applicant selected a total of 77,812 subjects subjected to both chest X-ray imaging and bone mineral density test, and secured the osteoporosis information or the bone mineral density information which are results of the chest X-ray imaging and the bone mineral density test as learning data. On the basis of this, medical image processing results of the medical image processing apparatus 100 according to the embodiment of the present invention were derived as shown in Table 1 below.

TABLE 1

| First input data set | AUC | Accuracy | Sensitivity | Specificity |
|---|---|---|---|---|
| Male + female (normal/osteoporosis) | 98% | 93.1% | 94.5% | 91.8% |
| Female (Normal/Osteoporotic) | 99% | 94.2% | 96.2% | 90.5% |
| Male (Normal/Osteoporotic) | 97% | 91.1% | 85.8% | 92.8% |
| Male + female (normal + osteopenia/osteoporosis) | 93% | 83.0% | 89.1% | 82.6% |

As can be seen from Table 1, according to the embodiment of the present invention, even when a bone mineral density test method such as dual energy X-ray absorptiometry or quantitative computed tomography is not used, the classification into the normal group and the high risk group for osteoporosis can be performed only by X-ray imaging test with a relatively low cost and low radiation exposure.

In the embodiments described so far, an example in which the artificial neural network model learns the training chest X-ray image or various images processed therefrom, and the learned model acquires the osteoporosis information or the bone mineral density information of the diagnosis target from the chest X-ray image of the diagnosis target has been described. However, the osteoporosis information or the bone mineral density information may be extracted from various body X-ray images including body bones as well as the chest X-ray images. For example, the artificial neural network model can learn the various body X-ray images and osteoporosis information or bone mineral density information corresponding thereto as learning data, and the artificial neural network model trained in this way can acquire the osteoporosis information or the bone mineral density information of the diagnosis target from the various body X-ray images of the diagnosis target. For example, the various body X-ray images may be a pelvis X-ray image, a head-neck X-ray image, an arm X-ray image, a leg X-ray image, a dental panoramic X-ray image, and the like.

Meanwhile, the respective steps included in the medical image learning method and the medical image processing method according to the embodiment described above can be implemented in a non-transitory computer readable recording medium that stores computer-executable instructions allowing a processor to perform the steps when the method is executed by the processor.

Further, the respective steps included in the medical image learning method and the medical image processing method according to the embodiment described above may be implemented in the form of a computer program programmed to perform these steps and stored in a non-transitory computer readable recording medium.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a non-transitory computer usable readable storage medium or non-transitory computer readable storage medium which can be directed to a computer or other programmable data processing equipment to implement a function in a specific manner. Accordingly, the instructions stored on the non-transitory computer usable readable storage medium or non-transitory computer readable storage medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

The invention claimed is:

1. A method for training an artificial neural network model by using a medical image, to be performed by a medical image processing apparatus, the method comprising:
preparing, as a first input data set, a training chest X-ray image, and a bone enhancement image acquired from the training chest X-ray image;
preparing, as first label data for the first input data set, osteoporosis information or bone mineral density information corresponding to the training chest X-ray image;
preparing, as a second input training data set, a fragment image including only some of a plurality of bones included in the training chest X-ray image;
preparing, as second label data, the osteoporosis information or the bone mineral density information corresponding to the second input training data set; and
training an artificial neural network model using the first input data set and the first label data,
wherein the first input data set contains more information than the second input training data set, and
wherein the fragment image is an image including two or less of a clavicle, cervical vertebrae, thoracic vertebrae, and scapula for the training chest X-ray image.

2. The method of claim 1, wherein the preparing the first input data set includes preparing a soft tissue image acquired from the training chest X-ray image, and
the first input data set further includes the soft tissue image.

3. The method of claim 1, comprising:
pre-training the artificial neural network model using the second input training data set, and then post-training the artificial neural network model using the first input data set.

4. A method for processing a medical image to be performed by a medical image processing apparatus, the method comprising:
inputting a chest X-ray image of a diagnosis target to an artificial neural network model, wherein the artificial neural network model is trained by:
preparing, as a first input data set, a training chest X-ray image, and a bone enhancement image acquired from the training chest X-ray image;
preparing, as first label data for the first input data set, osteoporosis information or bone mineral density information corresponding to the training chest X-ray image;
preparing, as a second input training data set, a fragment image including only some of a plurality of bones included in the training chest X-ray image;
preparing, as second label data, the osteoporosis information or the bone mineral density information corresponding to the second input training data set;
training an artificial neural network model using the first input data set and the first label data; and
outputting osteoporosis information or bone mineral density information acquired from the chest X-ray image of the diagnosis target using the artificial neural network model,
wherein the first input data set contains more information than the second input training data set, and
wherein the fragment image is an image including two or less of a clavicle, cervical vertebrae, thoracic vertebrae, and scapula for the training chest X-ray image.

5. The method of claim 4, wherein the outputting the osteoporosis information or bone mineral density information includes outputting a class activation map (CAM) in which the chest X-ray images of the diagnosis target are classified into a normal group and a risk group for osteoporosis on the basis of the osteoporosis information or the bone mineral density information.

6. A non-transitory computer-readable storage medium storing a computer program thereon, the medium comprising instructions for controlling a processor to perform a method for processing a medical image, the method comprising:
inputting a chest X-ray image of a diagnosis target to an artificial neural network model, wherein the artificial neural network model is trained by:
preparing, as a first input data set, a training chest X-ray image, and a bone enhancement image acquired from the training chest X-ray image;
preparing, as a first label data for the first input data set, osteoporosis information or bone mineral density information corresponding to the training chest X-ray image;
preparing, as a second input training data set, a fragment image including only some of a plurality of bones included in the training chest X-ray image;

preparing, as second label data, the osteoporosis information or the bone mineral density information corresponding to the second input training data set; and training an artificial neural network model using the first input data set and the first label data; and outputting osteoporosis information or bone mineral density information acquired from the chest X-ray image of the diagnosis target by the artificial neural network model, wherein the first input data set contains more information than the second input training data set, and wherein the fragment image is an image including two or less of a clavicle, cervical vertebrae, thoracic vertebrae, and scapula for the training chest X-ray image.

* * * * *